(12) United States Patent
Murschall et al.

(10) Patent No.: US 6,627,695 B2
(45) Date of Patent: Sep. 30, 2003

(54) WHITE, BIAXIALLY ORIENTED AND UV-RESISTANT POLYESTER FILM WITH CYCLOOLEFIN COPOLYMER (COC), ITS USE AND PROCESS FOR ITS PRODUCTION

(75) Inventors: Ursula Murschall, Nierstein (DE); Herbert Peiffer, Mainz (DE); Gottfried Hilkert, Saulheim (DE); Richard Lee Davis, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 9 days.

(21) Appl. No.: 09/781,802

(22) Filed: Feb. 12, 2001

(65) Prior Publication Data

US 2001/0031802 A1 Oct. 18, 2001

(30) Foreign Application Priority Data

Feb. 28, 2000 (DE) .......................... 100 09 246

(51) Int. Cl.⁷ .................. C08L 67/00; C08L 23/08; C08K 5/3432; B32B 27/36
(52) U.S. Cl. .................. 524/513; 524/100; 428/318.4; 428/319.3; 428/480; 428/903.3; 428/910
(58) Field of Search .................. 428/910, 319.3, 428/318.4, 480, 903.3; 524/100, 513

(56) References Cited

U.S. PATENT DOCUMENTS 5,824,465 A * 10/1998 Marien et al. ............ 430/31
5,843,578 A * 12/1998 Sasaki et al. ............ 428/315.5
6,270,888 B1 * 8/2001 Rutter et al. ............ 428/212
6,361,856 B1 * 3/2002 Wakai et al. ............ 428/220

FOREIGN PATENT DOCUMENTS

| DE | 2 353 347 | | 2/1973 |
|---|---|---|---|
| DE | 195 40 277 | | 5/1996 |
| EP | 0 300 060 | | 1/1989 |
| EP | 0 339 258 | A1 | 11/1989 |
| EP | 0 360 201 | | 3/1990 |
| EP | 0 522 758 | A1 | 1/1993 |
| EP | 0 786 495 | A2 | 7/1997 |
| EP | 0 795 399 | | 9/1997 |
| JP | 05-009319 | * | 1/1993 |
| JP | 05-140349 | * | 6/1993 |
| JP | 05230238 | A | 9/1993 |
| JP | 05-230253 | * | 9/1993 |
| JP | 11-035717 | * | 2/1999 |
| WO | WO 97/00284 | A1 | 1/1997 |

* cited by examiner

Primary Examiner—Peter Szekely
(74) Attorney, Agent, or Firm—ProPat, L.L.C.

(57) ABSTRACT

The present application relates to a white, biaxially oriented, UV-resistant polyester film with at least one base layer which comprises, based on the weight of the base layer, from 2 to 60% by weight of a cycloolefin copolymer (COC), where the glass transition temperature of the COC is within the range from 70 to 270° C. The film also comprises from 0.01 to 5.0% by weight of a UV stabilizer as light stabilizer, based on the weight of the base layer. The film of the invention is suitable for packing foods or other consumable items which are sensitive to light and/or to air, or for use in industry, e.g. in the production of hot-stamping foils or as a label film, or for image-recording papers, printed sheets or magnetic recording cards.

13 Claims, No Drawings

WHITE, BIAXIALLY ORIENTED AND UV-RESISTANT POLYESTER FILM WITH CYCLOOLEFIN COPOLYMER (COC), ITS USE AND PROCESS FOR ITS PRODUCTION

The present invention relates to a white, biaxially oriented, UV-resistant polyester film comprising at least one layer which comprises a polyester and a cycloolefin copolymer (COC). The invention further relates to the use of the polyester film, and to a process for its production.

BACKGROUND OF THE INVENTION

White, biaxially oriented polyester films are known from the prior art. These known prior art films are either easy to produce, have good optical properties or have acceptable processing performance.

DE-A 2 353 347 describes a process for producing milky polyester film having one or more layers, which comprises preparing a mixture from particles of a linear polyester with from 3 to 27% by weight of a homopolymer or copolymer of ethylene or propylene, extruding the mixture as a film, quenching the film and biaxially orienting the film via orientation in directions running perpendicular to one another, and heat-setting the film. A disadvantage of this process is that regrind which arises during production of the film (essentially a mixture of polyester and ethylene or propylene copolymer) cannot be reused without yellowing the film. However, this makes the process uneconomic, but the film produced with regrind would not gain acceptance in the market. In addition, the roughness of the film is much too high, and this gives the film a very matt appearance (very low gloss), undesirable for many applications.

EP-A 0 300 060 describes a single-layer polyester film which comprises, besides polyethylene terephthalate, from 3 to 40% by weight of a crystalline propylene polymer and from 0.001 to 3% by weight of a surface-active substance. The effect of the surface-active substance is to increase the number of vacuoles in the film and at the same time to reduce their size to the desired extent. This gives the film greater opacity and lower density. A residual disadvantage of the film is that regrind which arises during production of the film (essentially a mixture of polyester and propylene homopolymer) cannot be reused without yellowing the film. However, this makes the film uneconomic, but the film produced with regrind would not gain acceptance in the market. In addition, the roughness of the film is much too high, giving it a very matt appearance (very low gloss), undesirable for many applications.

EP-A 0 360 201 describes a polyester film having at least two layers and comprising a base layer with fine vacuoles, with a density of from 0.4 to 1.3 kg/dm$^3$, and having at least one outer layer whose density is above 1.3 kg/dm$^3$. The vacuoles are achieved by adding from 4 to 30% by weight of a crystalline propylene polymer, followed by biaxial stretching of the film. The additional outer layer improves the ease of production of the film (no streaking on the film surface), and the surface tension is increased and the roughness of the laminated surface can be reduced. A residual disadvantage is that regrind arising during production of the film (essentially a mixture of polyester and propylene homopolymer) cannot be reused without yellowing the film. However, this makes the process uneconomic, but the film produced with regrind would not gain acceptance in the market. In addition, the roughnesses of the films listed in the examples are still too high, giving the films a matt appearance (low gloss), undesirable for many applications.

EP-A 0 795 399 describes a polyester film having at least two layers and comprising a base layer with fine vacuoles, the density of which is from 0.4 to 1.3 kg/dm$^3$, and having at least one outer layer, the density of which is greater than 1.3 kg/dm$^3$. The vacuoles are achieved by adding from 5 to 45% by weight of a thermoplastic polymer to the polyester in the base, followed by biaxial stretching of the film. The thermoplastic polymers used are, inter alia, polypropylene, polyethylene, polymethylpentene, polystyrene or polycarbonate, and the preferred thermoplastic polymer is polypropylene. As a result of adding the outer layer, ease of production of the film is improved (no streaking on the film surface), the surface tension is increased and the roughness of the laminated surface can be matched to prevailing requirements. Further modification of the film in the base layer and/or in the outer layers, using white pigments (generally TiO$_2$) and/or using optical brighteners permits the properties of the film to be matched to the prevailing requirements of the application. A residual disadvantage is that regrind which arises during production of the film (essentially a mixture of polyester and the added polymer) cannot be reused without undefined and highly undesirable changes in the color of the film. This makes the process uneconomic, but the film produced with regrind would not gain acceptance in the market. In addition, the films listed in the examples continue to have excessive roughness values, giving them a matt appearance (low gloss), undesirable for many applications.

DE-A 195 40 277 describes a polyester film having one or more layers and comprising a base layer with fine vacuoles, with a density of from 0.6 to 1.3 kg/dm$^3$, and having planar birefringence of from −0.02 to 0.04. The vacuoles are achieved by adding from 3 to 40% by weight of a thermoplastic resin to the polyester in the base, followed by biaxial stretching of the film. The thermoplastic resins used are, inter alia, polypropylene, polyethylene, polymethylpentene, cyclic olefin polymers, polyacrylic resins, polystyrene or polycarbonate, preferred polymers being polypropylene and polystyrene. By maintaining the stated limits for the birefringence of the film, the film claimed has in particular superior tear strength and superior isotropy properties. However, a residual disadvantage is that regrind arising during production of the film cannot be reused without undefined discoloration of the film arising, and this is highly undesirable. This makes the process uneconomic, but the film produced with regrind would not gain acceptance in the market. In addition, the roughnesses of the films listed in the examples are still too high, giving them a matt appearance (low gloss), undesirable for many applications.

The object of the present invention was to provide a white, biaxially oriented polyester film which has high gloss and improved ease of production, i.e. low production costs, and which moreover has high UV resistance. In particular, it should be possible for cut material (regrind) directly associated with the production process to be reused in the production process at a concentration of from 10 to 70% by weight, based on the total weight of the film, without any significant resultant adverse effect on the physical or optical properties of the film produced with regrind. In particular, addition of regrind should not cause any significant yellowing of the film.

High UV resistance means that the film is damaged only slightly or not at all by sunlight or other UV radiation, and therefore that the films are suitable for outdoor applications and/or critical indoor applications. In particular, during outdoor use over a period of some years, the films should not yellow, embrittle or show surface-cracking, nor exhibit any impairment of mechanical properties. High UV resistance therefore means that the film absorbs UV light and does not begin to transmit light until the visible region has been reached.

DETAILED DESCRIPTION OF THE INVENTION

According to the invention, the object is achieved by means of a white, biaxially oriented and UV-resistant polyester film with at least one base layer made from polyester, the characterizing features of which are that at least the base layer also comprises, based on the weight of the base layer, from 2 to 60% by weight of a cycloolefin copolymer (COC), where the glass transition temperature of the cycloolefin copolymer (COC) is within the range from 70 to 270 C., and that the base layer comprises at least one UV stabilizer as light stabilizer.

The white, biaxially oriented polyester film as defined in the present invention is a film of this type whose whiteness is above 70%, preferably above 75% and particularly preferably above 80%. In addition, the opacity of the film of the invention is above 55%, preferably above 60% and particularly preferably above 65%.

To achieve the desired whiteness of the film of the invention, the amount of cycloolefincopolymer (COC) in the base layer should be above 2% by weight, otherwise the whiteness is below 70%. On the other hand, if the amount of COC is above 60% by weight, the film is no longer cost-effective to produce, since the process of orienting the film becomes unreliable.

It is also necessary for the glass transition temperature of the COC used to be above 70° C. Otherwise, if the glass transition temperature of the COC used is below 70° C., the polymer mixture is difficult to process, since it becomes difficult to extrude. The desired whiteness is lost and use of regrind gives a film with a tendency toward increased yellowness. On the other hand, if the glass transition temperature of the COC selected is above 270° C. the homogenization of the polymer mixture in the extruder will no longer be sufficient. This then gives a film with undesirably inhomogeneous properties.

In the preferred embodiment of the film of the invention, the glass transition temperature of the COCs used is within the range from 90 to 250° C., and in the particularly preferred embodiment it is within the range from 110 to 220° C.

Surprisingly, it has been found that a white, opaque, glossy film can be produced by adding a COC in the manner described above.

The whiteness and the opacity of the film can be adjusted with precision and adapted to particular requirements by varying the amount and nature of the COC added. This means that the use of other commonly used whitening or opacifying additives can substantially be dispensed with. It was also highly surprising that the surface roughness of the film is substantially lower, and therefore the gloss of the film substantially higher, than for comparable films of the prior art. A quite sensational discovery was the additional effect that, despite the presence of UV stabilizer, regrind exhibits no tendency toward yellowing, as is observed when using polymeric additives and sensitive UV stabilizers of the prior art.

None of the features described was foreseeable. This was particularly the case since COCs are evidently substantially incompatible with polyethylene terephthalate and are known to require stretching ratios and stretching temperatures similar to those for polyethylene terephthalate. Under these circumstances the skilled worker would not have expected that a white, opaque film with high gloss could be produced under these production conditions.

In the preferred and particularly preferred embodiments, the film of the invention has high/particularly high whiteness and high/particularly high opacity, while addition of regrind causes extremely little change in the color of the film.

The film of the invention comprises at least one UV stabilizer as light stabilizer, preferably fed by way of what is known as masterbatch technology, directly during film production, the amount of UV stabilizer being within the range from 0.01 to 5% by weight, based on the weight of the base layer.

Light, in particular the ultraviolet content of solar radiation, i.e. the wavelength region from 280 to 400 nm, causes degradation in thermoplastics, the results of which are not only a change in appearance due to color change or yellowing but also an extremely adverse effect on the mechanical and physical properties of the moldings or films made from the thermoplastics.

The suppression of this photooxidative degradation is of considerable industrial and economic importance, since without it many thermoplastics have drastically reduced scope of application.

The absorption of UV light by polyethylene terephthalates, for example, starts below 360 nm, increases markedly below 320 nm and is very pronounced below 300 nm. Maximum absorption occurs at between 280 and 300 nm.

In the presence of oxygen it is mainly chain cleavage which occurs, but without crosslinking. The predominant photooxidation products in quantity terms are carbon monoxide, carbon dioxide and carboxylic acids. Besides the direct photolysis of the ester groups, consideration has to be given to oxidation reactions which proceed via peroxide radicals, again to form carbon dioxide.

In the photooxidation of polyethylene terephthalates there can also be cleavage of hydrogen at the position $\alpha$ to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for pale-coloured films and indeed for transparent films, since they cause discoloration or color change.

For the purposes of the invention, light stabilizers which are suitable UV stabilizers are those which absorb at least 70%, preferably 80%, particularly preferably 90%, of the UV light in the wavelength region from 180 to 380 nm, preferably 280 to 350 nm. These are particularly suitable if they are thermally stable, i.e. do not decompose into cleavage products, or cause evolution of gas, in the temperature range from 260 to 300° C. Examples of light stabilizers which are suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, preferably the 2-hydroxybenzotriazoles and the triazines.

For the skilled worker it was highly surprising that the use of the combination according to the invention, made from COC and UV stabilizers, gave useful films with excellent properties. The person skilled in the art would probably have begun by attempting to achieve some degree of UV resistance by using an antioxidant, but would have immediately found that the film rapidly yellows on weathering.

With the background knowledge that UV stabilizers which absorb UV light and therefore have the potential for protection are known from the literature, the skilled worker would then probably have used commercially available UV stabilizers. He would then have found that the UV stabilizer has insufficient thermal stability and decomposes into cleavage products at temperatures of from 200 to 240° C., or causes evolution of gas, and he has to incorporate large amounts (from about 10 to 15% by weight) of UV stabilizer if the UV light is to be absorbed effectively, thus preventing damage to the film.

However, at these high concentrations he would have found that the film is yellow even immediately after production, with Yellowness Index differences (YID) around 25. He would also have found that mechanical properties are adversely affected. During orientation he would have encountered exceptional problems, such as:

break-off due to lack of strength, i.e. modulus of elasticity;

die deposits, causing variations in profile;

roller deposits from the UV stabilizer, an effect causing impairment of optical properties (poor haze, adhesion problems, non-uniform surface);

deposits in the stretching and setting frames, dropping onto the film.

It was therefore more than surprising that even low concentrations of the UV stabilizer of the invention achieve excellent UV protection. It was very surprising that, together with this excellent UV protection, the Yellowness Index of the film is unchanged from that of an unstabilized film within the bounds of accuracy of measurement;

there are no releases of gases, no die deposits and no frame condensation, and the film therefore has excellent optical properties and excellent profile and layflat;

the UV-resistant film has excellent stretchability, and therefore can be produced in a reliable and stable manner on high-speed film lines at speeds of up to 420 m/min.

The film is therefore also cost-effective.

It was also highly surprising that it is even possible to reuse regrind without any adverse effect on the Yellowness Index of the film.

If desired, the film of the invention may also comprise, based on the weight of the polyester, from 0 to 50 000 ppm, in particular from 20 to 30 000 ppm, particularly preferably from 50 to 25 000 ppm, of an optical brightener. The optical brightener is preferably fed to the polyester by way of what is known as masterbatch technology during film production.

The optical brighteners which may, if desired, be added are capable of absorbing UV radiation in the region from 360 to 380 nm and re-emitting this as longer-wavelength, visible blue-violet light.

Suitable optical brighteners are bisbenzoxazoles, phenylcoumarins and bisstearylbiphenyls, in particular phenylcoumarin, and particular preference is given to triazine phenylcoumarin, obtainable as ®Tinopal from Ciba-Geigy, Basle, Switzerland and ®Hostalux KS (Clariant, Germany), and also ®Eastobrite OB-1 (Eastman).

Besides the optical brightener, soluble blue dyes may also be added to the polyester if appropriate. Blue dyes which have proven suitable are cobalt blue, ultramarine blue and anthraquinone dyes, in particular ®Sudan Blue 2 (BASF, Ludwigshafen, Germany).

The amounts used of the blue dyes are from 0 to 10 000 ppm, in particular from 20 to 5000 ppm, particularly preferably from 50 to 1000 ppm, based on the weight of the polyester.

In one particularly preferred embodiment, the film of the invention comprises from 0.1 to 5.0% by weight of 2-(4,6-diphenyl-1,3,5-triazin-2-yl)-5-hexyloxyphenol of the formula:

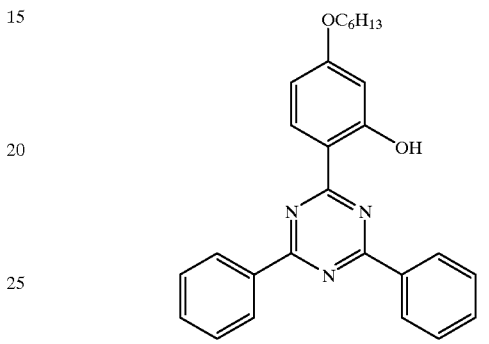

or from 0.1 to 5.0% by weight of 2,2'-methylenebis(6-(2H-benzotriazol-2-yl)-4-(1,1,2,2-tetramethylpropyl)phenol) of the formula

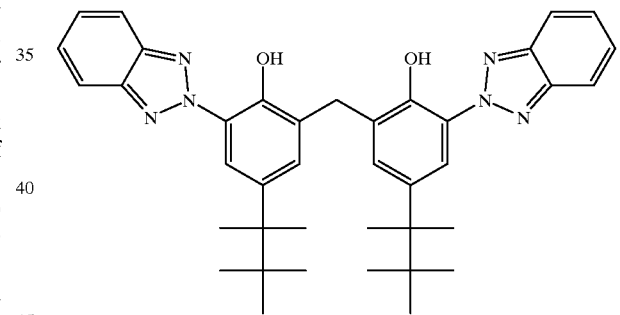

In another embodiment it is also possible to use mixtures of these two UV stabilizers or mixtures of at least one of these two UV stabilizers with other UV stabilizers, the total concentration of light stabilizers preferably being from 0.1 to 5.0% by weight, preferably within the range from 0.5 to 3.0% by weight, based on the weight of the base layer.

The film of the invention has one or more layers. Single-layer embodiments have a structure like that of the COC-containing layer described below. Embodiments having more than one layer have at least two layers and always comprise the COC-containing layer and at least one other layer, where the COC-containing layer is the base layer but may also form the intermediate layer or the outer layer of the film having two or more layers. In one preferred embodiment, the COC-containing layer forms the base layer of the film with at least one outer layer and preferably outer layers on both sides, and an intermediate layer or intermediate layers may be present, if desired, on one or both sides. In another preferred embodiment, the COC-containing layer also forms an intermediate layer of the multilayer film. Other embodiments with COC-containing intermediate layers have a five-layer structure with COC-containing intermediate layers on both sides of the COC-containing base layer. In another embodiment, the COC-containing layer may form, as well as the base layer, an outer layer or outer layers on the base layer or intermediate layer, on one or both sides. For the purposes of the present invention, the base layer is that layer which makes up more than from 50 to 100%, preferably from 70 to 90%, of the total film thickness. The outer layer is the layer which forms the outer layer of the film.

Each embodiment of the invention is a non-transparent, opaque film. For the purposes of the present invention, non-transparent films are those films whose light transmittance to ASTM D1003-77 is below 95%, preferably below 75%.

The COC-containing layer (the base layer) of the film of the invention comprises a polyester, preferably a polyester homopolymer, a COC, the UV stabilizer and also, if desired, other additives, in each case in effective amounts. This layer generally comprises at least 20% by weight, preferably from 40 to 98% by weight, in particular from 70 to 96% by weight, of polyester, based on the weight of the layer.

The base layer of the film comprises a thermoplastic polyester. Polyesters suitable here are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT) or else from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed of at least 90 mol %, preferably at least 95 mol %, of ethylene glycol units and terephthalic acid units or ethylene glycol units and naphthalene-2,6-dicarboxylic acid units. The remaining monomer units are derived from other aliphatic, cycloaliphatic or aromatic diols and, respectively, dicarboxylic acids, as may also be present in layer A (A=outer layer 1) or in layer C (C=outer layer 2) of a multilayered ABC (B=base layer) film.

Examples of other suitable aliphatic diols are diethylene glycol, triethylene glycol, aliphatic glycols of the formula HO—(CH$_2$)n—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclohexanediol). Other suitable aromatic diols are those, for example, of the formula HO—C$_6$H$_4$—X—C$_6$H$_4$—OH where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the (C$_3$–C$_{19}$)-alkanedioic acids are particularly suitable, where the alkane moiety may be straight-chain or branched.

The polyesters may, for example, be prepared by the transesterification process. The starting materials here are dicarboxylic esters and diols, and these are reacted using the usual transesterification catalysts, such as salts of zinc, of calcium, of lithium, of magnesium or of manganese. The intermediates are then polycondensed in the presence of typical polycondensation catalysts, such as antimony trioxide or titanium salts. They may equally well be prepared by the direct esterification process in the presence of polycondensation catalysts, starting directly from the dicarboxylic acids and the diols.

According to the invention, the COC-containing layer or, in the case of single-layer embodiments, the film, comprises an amount of not less than 2.0% by weight, preferably from 4 to 50% by weight and particularly preferably from 6 to 40% by weight, of a cycloolefin copolymer (COC), based on the weight of the layer or, in the case of single-layer embodiments, based on the weight of the film. It is significant for the present invention that the COC is not compatible with the polyethylene terephthalate and does not form a homogeneous mixture with the same.

Cycloolefin polymers are homopolymers or copolymers which contain polymerized cycloolefin units and, if desired, acyclic olefins as comonomer. Cycloolefin polymers suitable for the present invention contain from 0.1 to 100% by weight, preferably from 10 to 99% by weight, particularly preferably from 50 to 95% by weight, of polymerized cycloolefin units, in each case based on the total weight of the cycloolefin polymer. Particular preference is given to polymers which have been built up using the monomers comprising the cyclic olefins of the formulae I, II, III, IV, V or VI:

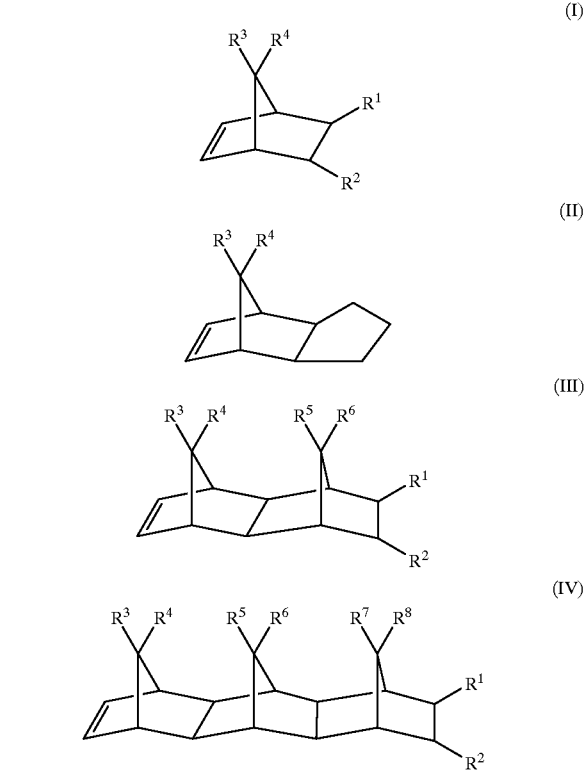

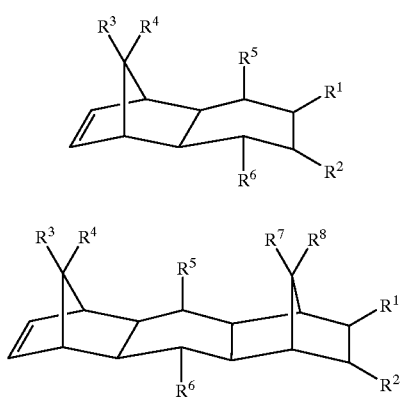

(V)

(VI)

$R^1$, $R^2$, $R^3$, $R^4$, $R^5$, $R^6$, $R^7$ and $R^8$ in these formulae are identical or different and are a hydrogen atom or a $C_1$–$C_{30}$-hydrocarbon radical, or two or more of the radicals $R^1$ to $R^8$ have been bonded cyclically, and the same radicals in the different formulae may have the same or a different meaning. Examples of $C_1$–$C_{30}$-hydrocarbon radicals are linear or branched $C_1$–$C_8$-alkyl radicals, $C_6$–$C_{18}$-aryl radicals, $C_7$–$C_{20}$-alkylenearyl radicals and cyclic $C_3$–$C_{20}$-alkyl radicals and acyclic $C_2$–$C_{20}$-alkenyl radicals.

If desired, the COCs may contain from 0 to 45% by weight, based on the total weight of the cycloolefin polymer, of polymerized units of at least one monocyclic olefin of the formula VII:

(VII)

n here is a number from 2 to 10.

If desired, the COCs may contain from 0 to 99% by weight, based on the total weight of the COC, of polymerized units of an acyclic olefin of the formula VIII:

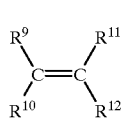

(VIII)

$R^9$, $R^{10}$, $R^{11}$ and $R^{12}$ here are identical or different and are a hydrogen atom or a $C_1$–$C_{10}$-hydrocarbon radical, e.g. a $C_1$–$C_8$-alkyl radical or a $C_6$–$C_{14}$-aryl radical.

Other polymers suitable in principle are cycloolefin polymers which are obtained by ring-opening polymerization of at least one of the monomers of the formulae I to VI, followed by hydrogenation.

Cycloolefin homopolymers have a structure composed of one monomer of the formulae I to VI. These cycloolefin polymers are less suitable for the purposes of the present invention. Polymers suitable for the purposes of the present invention are cycloolefin copolymers (COC) which comprise at least one cycloolefin of the formulae I to VI and acyclic olefins of the formula VIII as comonomer. Acyclic olefins preferred here are those which have from 2 to 20 carbon atoms, in particular unbranched acyclic olefins having from 2 to 10 carbon atoms, for example ethylene, propylene and/or butylene. The proportion of polymerized units of acyclic olefins of the formula VIII is up to 99% by weight, preferably from 5 to 80% by weight, particularly preferably from 10 to 60% by weight, based on the total weight of the respective COC.

Among the COCs described above, those which are particularly preferred contain polymerized units of polycyclic olefins having a fundamental nor-bornene structure. Particular preference is also given to COCa which contain polymerized units of acyclic olefins, In particular ethylene. Particular preference is in turn given to norbornene-ethylene copolymers and tetracyclododecene-ethylene copolymers which in each case contain from 5 to 80% by weight, preferably from 10 to 60% by weight, of ethylene (based on the weight of the copolymer).

The cycloolefin polymers generically described above generally have glass transition temperatures from −20 to 400° C. COCs which can be used for the invention have a glass transition temperature above 70° C., preferably above 90° C. and in particular above 110° C. The viscosity number (decalin, 135° C., DIN 53 728) is advantageously from 0.1 to 200 ml/g, preferably from 50 to 150 ml/g.

The COCs are prepared by heterogeneous or homogeneous catalysis with organometallic compounds, as described in a wide variety of documents. Suitable catalyst systems based on mixed catalysts made from titanium compounds and, respectively, vanadium compounds in conjunction with aluminum organyl compounds are described in DD 109 224, DD 237 070 and EP-A-0 156 464. EP-A-0 283 164, EP-A-0 407 870, EP-A-0 485 893 and EP-A-0 503 422 describe the preparation of COCs with catalysts based on soluble metallocene complexes. The preparation processes for COCs described in the abovementioned specifications are expressly incorporated herein by way of reference.

The COCs are incorporated into the film either in the form of pure granules or in the form of granulated concentrate (masterbatch), by premixing the polyester granules or polyester powder with the COC or, respectively, with the COC masterbatch, followed by feeding to an extruder. In the extruder, the mixing of the components continues and they are heated to the processing temperature. It is advantageous here for the novel process if the extrusion temperature is above the glass transition temperature $T_g$ of the COC, generally above the glass transition temperature of the COC by at least 5° C., preferably by from 10 to 180° C., in particular by from 15 to 150° C.

For the intermediate layers and for the outer layers, it is possible in principle to use the polymers used for the base layer. Besides these, other materials may also be is present in the outer layers, and the outer layers are then preferably composed of a mixture of polymers or of a copolymer or of a homopolymer which comprise ethylene 2,6-naphthalate units and ethylene terephthalate units. Up to 30 mol % of the polymers may be composed of other comonomers (e.g. ethylene isophthalate units).

The base layer and the other layers may additionally comprise conventional additives, such as stabilizers, antiblocking agents and other fillers. They are advantageously added to the polymer or, respectively, to the polymer mixture prior to melting. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

The additives selected may also comprise mixtures of two or more different antiblocking agents or mixtures of antiblocking agents of the same composition but different particle sizes. The particles may be added to the polymers of the individual layers of the film in the respective advantageous concentrations, e.g. as a glycolic dispersion during the polycondensation or via masterbatches during extrusion. Pigment concentrations which have proven particularly suitable are from 0 to 25% by weight (based on the weight of the respective layer). EP-A-0 602 964, for example, describes the antiblocking agents in detail.

To improve the whiteness of the film, the base layer or the other additional layers may comprise further pigmentation. It has proven particularly advantageous here for the additional materials added to be barium sulfate with a particle size of from 0.3 to 0.8 µm, preferably from 0.4 to 0.7 µm, or titanium dioxide with a particle size of from 0.05 to 0.3 µm. This gives the film a brilliant white appearance. The concentration of barium sulfate or titanium dioxide is within the range from 1 to 25% by weight, preferably from 1 to 20% by weight, and very preferably from 1 to 15% by weight.

The total thickness of the film may vary within wide limits and depends on the application envisaged. The preferred embodiments of the novel film have total thicknesses of from 4 to 400 µm, preferably from 8 to 300 µm, particularly preferably from 10 to 300 µm. The thickness of any intermediate layer(s) present is/are, in each case independently of one another, from 0.5 to 15 µm, preferably from 1 to 10 µm, in particular from 1 to 8 µm. All the values given are based on one intermediate layer. The thickness of the outer layer(s) is selected independently of the other layers and is preferably within the range from 0.1 to 10 µm, in particular from 0.2 to 5 µm, preferably from 0.3 to 2 µm, and outer layers applied on both sides may be identical or different in terms of their thickness and composition. The thickness of the base layer is therefore given by the difference between the total thickness of the film and the thickness of the outer and intermediate layer(s) applied, and, similarly to the total thickness, may therefore vary within wide limits.

The invention further provides a process for producing the polyester film of the invention by the extrusion or coextrusion process known per se.

For this process, the procedure is that the melt(s) corresponding to the single-layer film or to the individual layers of the film is/are extruded/coextruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

The biaxial orientation is generally carried out in succession. For this, it is preferable to orient first longitudinally (i.e. in MD, the machine direction) and then transversely (i.e. in TD, perpendicularly to the machine direction). This orientates the molecular chains. The longitudinal orientation preferably takes place with the aid of two rolls rotating at different rates corresponding to the desired stretching ratio. For the transverse stretching, an appropriate suitable tenter frame is generally used.

Simultaneous orientation of the film of the invention in the two directions (MD and TD) with the aid of a tenter frame suitable for this purpose has proven not to be appropriate, since this stretching method gives a film which has insufficient whiteness and insufficient opacity.

The temperature at which the orientation is carried out may be varied over a relatively wide range and depends on the properties desired in the film. In general, the longitudinal stretching is carried out at from 80 to 130° C. and the transverse stretching at from 90 to 150° C. The longitudinal stretching ratio is generally within the range from 2.5:1 to 6:1, preferably from 3:1 to 5.5:1. The transverse stretching ratio is generally within the range from 3.0:1 to 5.0:1, preferably from 3.5:1 to 4.5:1. In the heat-setting which follows, the film is held at a temperature of from 150 to 250° C. for from about 0.1 to 10 s. The film is then cooled and then wound up in the usual manner.

To establish other desired properties, the film may be chemically treated or else corona- or, respectively, flame-treated. The intensity of treatment is selected such that the surface tension of the film is generally above 45 mN/m.

To establish other properties, the film may also be coated. Typical coatings have adhesion-promoting, antistatic, slip-improving or release action. It is clear that these additional coatings may be applied to the film by in-line coating using aqueous dispersions, prior to the transverse stretching procedure.

The particular advantage of the novel film is its high whiteness and high opacity, together with UV resistance. Surprisingly, the gloss of the film was also very high. The whiteness of the film is above 70%, preferably above 75% and particularly preferably above 80%. The opacity of the novel film is above 55%, preferably above 60% and particularly preferably above 65%. The gloss of the novel film is above 80, preferably above 90 and particularly preferably above 100.

Another particular advantage of the invention is that regrind material produced directly during the production process can be reused for film production at a concentration of from 10 to 70% by weight, based on the total weight of the film, without any significant negative effect on the physical properties of the film. In particular, the regrinded material (composed essentially of polyester and COC) does not give undefined changes in the color of the film, as is the case in the films of the prior art.

A further advantage of the invention is that the production costs of the novel film are comparable with those of conventional opaque films of the prior art. The other properties of the novel film relevant to its processing and use remain essentially unchanged or are even improved.

The film has excellent suitability for packing foods or other consumable items which are sensitive to light and/or to air. It is also highly suitable for use in the industrial sector, e.g. for producing hot-stamping foils or as a label film. Besides this, the film is, of course, particularly suitable for image-recording papers, printed sheets, magnetic recording cards, to name just a few possible applications.

The processing performance and winding performance of the film, in particular on high-speed machines (winders, metallizers, printing machines and laminating machines) is exceptionally good. A measure of processing performance is the coefficient of friction of the film, which is below 0.6. A decisive factor affecting winding performance, besides a good thickness profile, excellent layflat and a low coefficient of friction, is the roughness of the film. It has become apparent that the winding of the novel film is particularly good if the average roughness is within the range from 50 to 250 nm while the other properties are complied with. The roughness may be varied within the stated range by, inter alia, varying the COC concentration and the process parameters in the production process.

The most important film properties according to the invention are again summarized in the table below (Table 1), providing a particularly clear picture.

TABLE 1

|  | Range according to the invention | Preferred | Particularly preferred | Unit | Test method |
|---|---|---|---|---|---|
| Composition |  |  |  |  |  |
| Concentration of cycloolefin copolymer (COC) in base layer | 2–60 | 4–50 | 6–40 | % |  |
| Glass transition temperature of cycloolefin copolymer (COC) | 70–270 | 90–250 | 110–220 | °C. | DIN 73 765 |
| UV stabilizer | 0.01–5.0 | 0.1–5.0 | 0.5–3.0 | % | Weathering with Atlas Ci65 Weather-Ometer |
| Film properties |  |  |  |  |  |
| Whiteness | >70 | >75 | >80 | % | Berger |
| Opacity | >55 | >60 | >65 | % | DIN 53 146 |
| COF | <0.6 | <0.55 | <0.5 |  | DIN 53 375 |
| Gloss | >80 | >90 | >100 |  | DIN 67 530 |
| Average roughness $R_a$ | 50–250 | 60–230 | 70–200 | nm | DIN 4768, cut-off of 0.25 mm |

The following values were measured to characterize the polymers and the films:

SV (DCA), IV (DCA)

The standard viscosity SV (DCA) is measured in dichloroacetic acid by analogy with DIN 53726.

The intrinsic viscosity (IV) is calculated as follows from the standard viscosity (SV)

$$IV (DCA) = 6.67 \cdot 10^{-4} \, SV (DCA) + 0.118$$

Surface Defects and Uniformity of Coloration

Surface defects and uniformity of coloration are determined visually.

Weathering (on Both Sides) and UV Resistance

UV resistance is tested as follows to the ISO 4892 test specification:

| Test equipment | Atlas Ci65 Weather-Ometer |
| Test conditions | ISO 4892, i.e. artificial weathering |
| Irradiation time | 1000 hours (per side) |
| Irradiation | 0.5 W/m², 340 nm |
| Temperature | 63° C. |
| Relative humidity | 50% |
| Xenon lamp | Internal and external filter made from borosilicate |
| Irradiation cycles | 102 minutes of UV light, then 18 minutes of UV light with water spray on the specimens, then again 102 minutes of UV light, etc. |

Coefficient of Friction

Coefficient of friction is determined to DIN 53 375. The coefficient of sliding friction was determined 14 days after production.

Surface Tension

Surface tension was determined by what is known as the ink method (DIN 53 364).

Roughness

Roughness $R_a$ of the film was determined to DIN 4768 with a cut-off of 0.25 mm.

Whiteness and Opacity

Whiteness and opacity were determined with the aid of a Zeiss, Oberkochem (DE) "ELREPHO" electric reflectance photometer, standard illuminant C, 2° normal observer. Opacity is determined to DIN 53 146. Whiteness is defined as W=RY+3RZ−3RX. W=whiteness, RY, RZ and RX=relevant reflection factors when the Y, Z and X color-measurement filter is used. The white standard used was a barium sulfate pressing (DIN 5033, Part 9). A detailed description is given, for example, in Hansl Loos "Farbmessung" [Color measurement], Verlag Beruf und Schule, Itzehoe (1989).

Light Transmittance

Light transmittance is measured using a method based on ASTM D1033-77.

Gloss

Gloss was determined to DIN 67 530. The reflectance was measured as an optical value characteristic of a film surface. Based on the standards ASTM-D 523-78 and ISO 2813, the angle of incidence was set at 60°. A beam of light hits the flat test surface at the set angle of incidence and is reflected and/or scattered by this surface. A proportional electrical variable is displayed representing light beams hitting the photoelectronic detector. The value measured is dimensionless and must be stated together with the angle of incidence.

Glass Transition Temperature

The glass transition temperature $T_g$ was determined using film specimens with the aid of DSC (differential scanning calorimetry) (DIN 73 765). A DuPont DSC 1090 was used. The heating rate was 20 K/min and the specimen weight was about 12 mg. The glass transition $T_g$ was determined in the first heating procedure. Many of the specimens showed an enthalpy relaxation (a peak) at the beginning of the step-like glass transition. The temperature taken as $T_g$ was that at which the step-like change in heat capacity—without reference to the peak-shaped enthalpy relaxation—achieved half of its height in the first heating procedure. In all cases, there was only a single glass transition observed in the thermogram in the first heating procedure.

EXAMPLE 1

Inventive

Chips of polyethylene terephthalate (prepared by the transesterification process using Mn as transesterification catalyst, Mn concentration: 100 ppm) were dried at 150° C. to a residual moisture below 100 ppm and fed to the extruder for the base layer B. Alongside this, chips of ®Topas 6015 cycloolefin copolymer (COC) from Ticona (COC composed of 2-norbornene and ethylene, see also W. Hatke: Folien aus COC [COC Films], Kunststoffe 87 (1997) 1, pp. 58–62) with a glass transition temperature $T_g$ of about 160° C. were also fed to the extruder for the base layer B. The proportional amount of the cycloolefin copolymer (COC) in the entire film was 10% by weight. 1.0% by weight of the UV stabilizer 2-(4,6-diphenyl-1,3,5-triazin-2-yl)-5-hexyloxyphenol (®Tinuvin 1577 from Ciba-Geigy, Basle, Switzerland) were also added. Tinuvin 1577 has a melting point of 149° C. and is thermally stable up to about 330° C.

Extrusion followed by stepwise longitudinal and transverse orientation was used to produce a white, opaque, single-layer film with an overall thickness of 23 μm.

Base layer B was a mixture of:

| | |
|---|---|
| 89.0% by weight of | polyethylene terephthalate homopolymer with an SV of 800 |
| 10.0% by weight of | cycloolefin copolymer (COC) from Ticona, Topas 6015 |
| 1.0% by weight of | Tinuvin 1577 |

The production conditions in the individual steps of the process were:

| | | |
|---|---|---|
| Extrusion: | Temperatures Base layer: | 280° C. |
| | Take-off roll temperature: | 30° C. |
| Longitudinal stretching: | Temperature: | 80–125° C. |
| | Longitudinal stretching ratio: | 4.2 |
| Transverse stretching: | Temperature: | 80–135° C. |
| | Transverse stretching ratio: | 4 |
| Setting: | Temperature: | 230° C. |
| | Duration: | 3 s |

The film had the required good properties and the desired handling properties, and the desired processing performance. The properties achieved in films produced in this way are shown in Table 2.

EXAMPLE 2

Inventive

A change was made from Example 1 by adding 50% by weight of regrind to the base layer. The amount of COC in the film thus produced was again 10% by weight, the amount of UV stabilizer was 1% by weight. The process parameters were unchanged from Example 1. A visual observation was made of any yellow coloration of the film. It can be seen from Table 2 that hardly any yellow coloration of the film could be observed.

Base layer B was a mixture of:

| | |
|---|---|
| 45.0% by weight of | polyethylene terephthalate homopolymer with an SV of 800 |
| 50.0% by weight of | regrind (90% by weight of polyester + 10% by weight of Topas 6015 + 1% by weight of Tinuvin 1577) |
| 5.0% by weight of | cycloolefin copolymer (COC) from Ticona, Topas 6015 |
| 0.5% by weight of | Tinuvin 1577 |

EXAMPLE 3

Inventive

Example 1 was now modified by producing a film of thickness 96 μm. The amount of COC in the film was 8% by weight, the amount of Tinuvin 1577 was 1% by weight. The process parameters were unchanged from Example 1. A visual observation was made of any yellow coloration of the film. It can be seen from Table 2 that no yellow coloration of the film was observed.

Base layer B was a mixture of:

| | |
|---|---|
| 91.0% by weight of | polyethylene terephthalate homopolymer with an SV of 800 |
| 8.0% by weight of | cycloolefin copolymer (COC) from Ticona, Topas 6015 |
| 1.0% by weight of | Tinuvin 1577 |

EXAMPLE 4

Inventive

A change was made from Example 3 by adding 50% by weight of regrind to the base. The amount of COC in the film was again 8% by weight, the amount of Tinuvin 1577 was 1% by weight. The process parameters were unchanged from Example 1. A visual observation was made of any yellow coloration of the film. It can be seen from Table 2 that hardly any yellow coloration of the film could be observed.

Base layer B was a mixture of:

| | |
|---|---|
| 55.0% by weight of | polyethylene terephthalate homopolymer with an SV of 800 |
| 50.0% by weight of | self-generated regrind (90% by weight of polyester + 10% by weight of Topas 6015 + 1% by weight of Tinuvin 1577) |
| 4.0% by weight of | cycloolefin copolymer (COC) from Ticona, Topas 6015 |
| 0.5% by weight of | Tinuvin 1577 |

Comparative Example 1

Example 1 from DE-A 2 353 347 was repeated. The example was modified with concomitant use of 50% by weight of regrind. It can be seen from Table 2 that marked yellow coloration of the film was observed. In addition, the roughness of the film is much too high for many applications, and the gloss is too low for many applications. It is highly probable that this is attributable to the use of other polymeric additives.

Base layer B was a mixture of:

| | |
|---|---|
| 47.5% by weight of | polyethylene terephthalate homopolymer with an SV of 800 |
| 50.0% by weight of | self-generated regrind (95% by weight of polyester + 5% by weight of polypropylene) |
| 2.5% by weight of | polypropylene |

Comparative Example 2

Example 1 from EP-A 0 300 060 was repeated. The example was modified with concomitant use of 50% by weight of regrind. It can be seen from Table 2 that marked yellow coloration of the film was observed. In addition, the roughness of the film is much too high for many applications, and the gloss is too low for many applications. It is highly probable that this is attributable to the use of other polymeric additives.

Base layer B was a mixture of:

| | |
|---|---|
| 45.0% by weight of | polyethylene terephthalate homopolymer with an SV of 800 |
| 50.0% by weight of | self-generated regrind (95% by weight of polyester + 5% by weight of polypropylene) |
| 5.0% by weight of | polypropylene |

Comparative Example 3

Example 1 from EP-A 0 360 201 was repeated. The example was modified with concomitant use of 50% by weight of regrind. It can be seen from Table 2 that marked yellow coloration of the film was observed. In addition, the roughness of the film is much too high for many applications, and the gloss is too low for many applications. It is highly probable that this is attributable to the use of other polymeric additives.

Base layer B was a mixture of:

| | |
|---|---|
| 40.0% by weight of | polyethylene terephthalate homopolymer with an SV of 800 |
| 50.0% by weight of | self-generated regrind (95% by weight of polyester + 5% by weight of polypropylene) |
| 10.0% by weight of | polypropylene |

Comparative Example 4

Example 1 from DE-A 195 40 277 was repeated. The example was modified with concomitant use of 50% by weight of regrind. It can be seen from Table 2 that marked yellow coloration of the film was observed. In addition, the roughness of the film is much too high for many applications, and the gloss is too low for many applications. It is highly probable that this is attributable to the use of other polymeric additives.

Base layer B was a mixture of:

| | |
|---|---|
| 43.5% by weight of | polyethylene terephthalate homopolymer with an SV of 800 |
| 50.0% by weight of | self-generated regrind (95% by weight of polyester + 5% by weight of polystyrene) |
| 6.5% by weight of | polystyrene |

TABLE 2

| Example | Film thickness μm | Layer structure | Added to polyester | Additive concentration in base layer % | Glass transition temperature of additive °C. | Whiteness % | Opacity % | Evaluation of film yellowness | Gloss | Coefficient of friction COF Side A against Side C | Average roughness $R_a$ nm Side A | Side C |
|---|---|---|---|---|---|---|---|---|---|---|---|---|
| E1 | 23 | B | COC | 10 | 170 | 75 | 75 | ++ | 115 | 0.52 | 120 | 120 |
| E2 | 23 | B | COC | 10 | 170 | 76 | 80 | + | 120 | 0.50 | 110 | 110 |
| E3 | 96 | B | COC | 8 | 170 | 85 | 85 | ++ | 125 | 0.42 | 100 | 100 |
| E4 | 96 | B | COC | 8 | 170 | 86 | 90 | + | 130 | 0.35 | 98 | 98 |
| CE 1 | 155 | B | Polypropylene | 5 | −10 | 80 | 70 | − | 46 | 0.45 | 410 | 410 |
| CE 2 | 100 | B | Polypropylene | 10 | −10 | 88 | 80 | − | 57 | 0.45 | 180 | 180 |
| CE 3 | 100 | ABA | Polypropylene | 20 | −10 | 92 | 89 | − | 54 | 0.25 | 370 | 370 |
| CE 4 | 125 | B | Polystyrene | 13 | 100 | 82 | 82 | − | 51 | 0.35 | 480 | 480 |

Key to yellowness in films produced:
++: no yellowing detectable
+: slight yellow coloration detectable
−: marked yellow coloration detectable yellow coloration of the film was observed. In addition, the roughness of the film is much too high for many applications, and the gloss is too low for many applications. It is highly probable that this is attributable to the use of other polymeric additives.

Each of the films produced in Examples 1 to 4 and Comparative Examples 1 to 4 was exposed to 1000 hours per side of weathering with an Atlas Ci65 Weather-Ometer. The films produced in the inventive Examples 1 to 4 showed no significant changes in properties.

In contrast, the films of Comparative Examples 1 to 4 showed surface cracks and embrittlement phenomena after 1000 hours of weathering with an Atlas Ci65 Weather-Ometer. It was therefore impossible to measure any accurate property profile for these films, in particular their mechanical properties. In addition, the films showed marked visible yellow coloration.

What is claimed is:

1. A white, biaxially oriented and UV-resistant polyester film comprising at least one layer, wherein at least this layer comprises, based on the weight of this layer, from 8–10% by weight of a cyoloolefin copolymer (CCC) selected from the group consisting of ethylene/norbornene and ethylene/tetracyclododecene, where the glass transition temperature of the CCC is within the range from 70 to 270° C., and wherein the layer comprises at least one UV stabilizer as light stabilizer, said layer containing 10–70% by weight of this layer of a regrind.

2. The polyester film as claimed in claim 1, wherein the COC has a glass transition temperature within the range from 90 to 250° C. and wherein the amount of UV stabilizer is within the range from 0.01 to 5.0% by weight, based on the total weight of the layer.

3. The polyester film as claimed in claim 1, wherein the cycloolefin copolymer (COC) has a glass transition temperature within the range from 110 to 220° C., and wherein the UV stabilizer has been selected from 2-hydroxybenzotriazoles or from triazines or from 2-hydroxybenzotriazoles and triazines.

4. The polyester film as claimed in claim 1, wherein the whiteness of the film is above 70%, and wherein the UV stabilizer is 2-(4,6-diphenyl-1,3,5-triazin-2-yl)-5-hexyloxyphenol or 2,2'-methylenebis(6-(2H-benzotriazol-2-yl)-4-(1,1,2,2-tetramethylpropyl)phenol) or 2-(4,6-diphenyl-1,3,5-triazin-2-yl)-5-hexyloxyphenol or 2,2'-methylenebis(6-(2H-benzotriazol-2-yl)-4-(1,1,2,2-tetramethylpropyl)phenol).

5. The polyester film as claimed in claim 1, wherein the opacity of the film is above 55%.

6. The polyester film as claimed in claim 1, wherein the gloss of the film is above 80.

7. The polyester film as claimed in claim 1, wherein the layer comprises from 0.5 to 25% by weight of vacuole-inducing fillers or white fillers or pigment, or vacuole-inducing fillers and white fillers or vacuole-inducing fillers and white fillers and pigments in each case based on the weight of the layer.

8. A white, biaxially oriented and UV-resistant polyester film comprising at least one layer, wherein at least this layer comprises, based on the weight of this layer, from 8–10% by weight of a cycloolefin copolymer (COC) selected from the group consisting of ethylene/norbornene and ethylene/tetracyolododecene, where the glass transition temperature of the COC is within the range from 70 to 270° C., and wherein the layer comprises at least one UV stabilizer as light stabilizer, said layer containing 10–70% by weight of this layer of a regrind, wherein at feast one outer layer has been arranged on the COC-containing layer, and wherein the UV stabilizer is present in the outer layer(s).

9. The polyester film as claimed in claim 8, wherein an intermediate layer has been arranged between the COC-containing layer and the outer layer.

10. The polyester film as claimed in claim 1, wherein the film has one layer and is composed of the COC-containing layer.

11. A white, biaxially oriented, UV-resistant polyester film comprising at least one layer, which comprises, based on the weight of this layer, from 8–10% by weight of a cycloolefin copolymer (COC) selected from the group consisting of ethylene/norbornene and ethylene/tetracyclododecene, where the opacity of the film is above 60%, wherein the film also comprises from 0.1 to 5% by weight, of a UV stabilizer as light stabilizer, said layer containing 10–70% by weight of this layer of a regrind.

12. A white, biaxially oriented, UV-resistant polyester film comprising at least one layer, which comprises, based on the weight of this layer, from 8–10% by weight of a cycloolefin copolymer (COC) selected from the group consisting of ethylene/norbornene and ethylene/tetracyclododecene, and the whiteness of which is above 70%, wherein the film also comprises from 0.1 to 5% by weight, by weight, of a UV stabilizer as light stabilizer, said layer containing 10–70% by weight of this layer of a regrind.

13. A white, biaxially oriented, UV-resistant polyester film comprising at least one layer. which comprises, based on the weight of this layer, from 8–10% by weight of a cycloolefin copolymer (COC) selected from the group consisting of ethylene/norbornene and ethylene/tetracyclododecene, and the gloss of which is above 80, wherein the film also comprises from 0.1 to 5%, by weight, of a UV stabilizer as light stabilizer, said layer containing 10–70% by weight of this layer of a regrind.

* * * * *